US010834899B1

(12) United States Patent
Heathwood et al.

(10) Patent No.: US 10,834,899 B1
(45) Date of Patent: Nov. 17, 2020

(54) FEATHER FLYER PET TOY

(71) Applicant: Worldwise, Inc., Novato, CA (US)

(72) Inventors: Karen Heathwood, San Rafael, CA (US); Hannah Rosenberg, San Francisco, CA (US)

(73) Assignee: Worldwise, Inc., Novat, CA (US)

( * ) Notice: Subject to any disclaimer, the term of this patent is extended or adjusted under 35 U.S.C. 154(b) by 518 days.

(21) Appl. No.: 15/343,669

(22) Filed: Nov. 4, 2016

(51) Int. Cl.
*A01K 15/02* (2006.01)

(52) U.S. Cl.
CPC .................. *A01K 15/025* (2013.01)

(58) Field of Classification Search
CPC .................................. A01K 15/025
USPC .......................................... 119/711
See application file for complete search history.

(56) References Cited

U.S. PATENT DOCUMENTS

| | | | | |
|---|---|---|---|---|
| 1,011,856 A * | 12/1911 | Sadler | A63B 67/183 | 473/580 |
| 1,265,926 A * | 5/1918 | Ludlam | A01K 15/025 | 119/710 |
| 1,667,450 A * | 4/1928 | Zimmerman | A63B 49/02 | 473/540 |
| 5,080,374 A * | 1/1992 | Yu | A63B 67/18 | 273/DIG. 30 |
| 5,522,599 A * | 6/1996 | Kim | A63B 67/183 | 473/579 |
| 5,778,825 A * | 7/1998 | Krietzmen | A01K 15/025 | 119/708 |
| 6,318,300 B1 * | 11/2001 | Renforth | A01K 15/025 | 119/702 |
| 6,892,675 B1 * | 5/2005 | Comerford | A01K 15/025 | 119/706 |
| 6,899,059 B1 * | 5/2005 | Crane | A01K 15/025 | 119/711 |
| 7,574,978 B1 * | 8/2009 | Peterson | A01K 15/02 | 119/709 |
| 7,975,655 B2 * | 7/2011 | Piaget | A01K 15/025 | 119/51.01 |
| D661,435 S * | 6/2012 | Christianson | D30/160 | |
| 8,336,501 B2 * | 12/2012 | Haaf | A01K 13/004 | 119/621 |
| 2002/0174838 A1 * | 11/2002 | Crane | A01K 15/025 | 119/707 |
| 2004/0011299 A1 * | 1/2004 | Lamson-Scribner | A01K 15/025 | 119/708 |
| 2004/0139927 A1 * | 7/2004 | Homan | A01K 15/026 | 119/711 |
| 2007/0119384 A1 * | 5/2007 | Ritchey | A01K 15/025 | 119/708 |
| 2008/0127904 A1 * | 6/2008 | Kling | A01K 15/025 | 119/710 |
| 2008/0196676 A1 * | 8/2008 | Kim | A01K 15/025 | 119/707 |
| 2008/0230013 A1 * | 9/2008 | Man | A01K 15/025 | 119/708 |

(Continued)

*Primary Examiner* — Joshua D Huson
(74) *Attorney, Agent, or Firm* — Bay Area Technology Law Group PC

(57) ABSTRACT

A pet toy having a head region and a tail, the head region having an outer shell defining its shape and for enclosing a fill material. The fill material, contained within the head region is a cat stimulant such as catnip and/or silver vine. A tail in the form of a plurality of feathers is fixed to the head region and fan out there from.

4 Claims, 1 Drawing Sheet

(56) References Cited

U.S. PATENT DOCUMENTS

| | | | | |
|---|---|---|---|---|
| 2008/0236511 | A1* | 10/2008 | Boelke | A01K 15/021 |
| | | | | 119/707 |
| 2011/0100304 | A1* | 5/2011 | Tsuyuki | A01K 15/025 |
| | | | | 119/707 |
| 2011/0162587 | A1* | 7/2011 | Hass | A01K 15/025 |
| | | | | 119/710 |
| 2012/0085294 | A1* | 4/2012 | Christianson | A01K 15/025 |
| | | | | 119/707 |
| 2012/0122618 | A1* | 5/2012 | Hart | A63B 67/08 |
| | | | | 473/570 |
| 2012/0125266 | A1* | 5/2012 | Ying | A01K 15/025 |
| | | | | 119/707 |
| 2014/0000532 | A1* | 1/2014 | Cogswell | A01K 15/025 |
| | | | | 119/708 |
| 2015/0013616 | A1* | 1/2015 | Tsengas | A01K 15/025 |
| | | | | 119/711 |
| 2015/0359194 | A1* | 12/2015 | Coopman | A01K 15/025 |
| | | | | 119/706 |
| 2016/0302387 | A1* | 10/2016 | Floyd | A01K 15/025 |
| 2017/0094942 | A1* | 4/2017 | Foley | A01K 15/025 |

* cited by examiner

FEATHER FLYER PET TOY

TECHNICAL FIELD

The present invention is directed to a pet toy specifically intended to captivate and intrigue cats. The pet toy is in the nature of a shuttlecock and includes attractants such as catnip and silver vine.

BACKGROUND OF THE INVENTION

It is well known that pet cats require stimulation. Without it, they get bored which can result in health problems and associated unwelcome antisocial behavior. It is also known to anyone owning a pet cat that they possess a natural instinct to hunt and pounce upon moving objects and can be mesmerized by them. This stems from their instinctual need to chase prey. As such, cat owners often times dangle attractants in front of their pets observing as the pet swats and even pounces upon them.

It is also known that catnip or nepatia cataria has a hallucinogenic effect upon cats although it is not toxic. This "catnip response" is due to the plant's active ingredient, nepetalactone. When a cat smells catnip, it characteristically exhibits a range of behaviors somewhat dependent upon the age of the cat, genetics and whether it is capable of reproduction. Most reactions last for 5 to 15 minutes and include sniffing, licking and chewing, chin and cheek rubbing, hip and head-over rolling and body rubbing. The feline receptor for the active ingredient nepetalactone is contained within the animal's vomer nasal organ which may explain why cats do not react from eating gelatin capsules of catnip. The nepetalactone must be inhaled for it to reach the animal's receptor organs. Similarly, actinida polygama or silver vine is a non-toxic plant and has long been known to elicit a euphoric response in cats. In fact, it is the most popular cat treat in Asia and is similar to catnip in its response but appears to be more intense.

Although there have been numerous examples of cat toys which include both catnip and silver vine, there has been a dearth of toys which combine them in non-mechanical, simple toys which not only elicit the sought after hallucinogenic effect but also move erratically to stimulate the cat's hunt and pray instincts.

It is thus an object of the present invention to create a product which not only maximizes the benefits of catnip and/or silver vine but also does so in a tossable toy which is inexpensive to produce yet effective.

This and other objects will be more readily apparent when considering the following disclosure and appended claims.

SUMMARY OF THE INVENTION

A pet toy comprising a head region and a tail, said head region comprising an outer shell defining its shape and for enclosing a fill material, a fill material comprising a member selected from the group consisting of catnip, silver vine, and mixtures thereof said tail comprising a plurality of feathers, each of said feathers being affixed to said head region and which fan out therefrom.

A method of attracting a pet cat, said method comprising tossing a pet toy, said pet toy comprising a head region and a tail, said head region comprising an outer shell defining its shape and for enclosing a fill material, a fill material comprising a member selected from the group consisting of catnip, silver vine, and mixtures thereof said tail comprising a plurality of feathers, each of said feathers being affixed to said head region and which fan out therefrom.

DETAILED DESCRIPTION OF THE INVENTION

Figure 1:
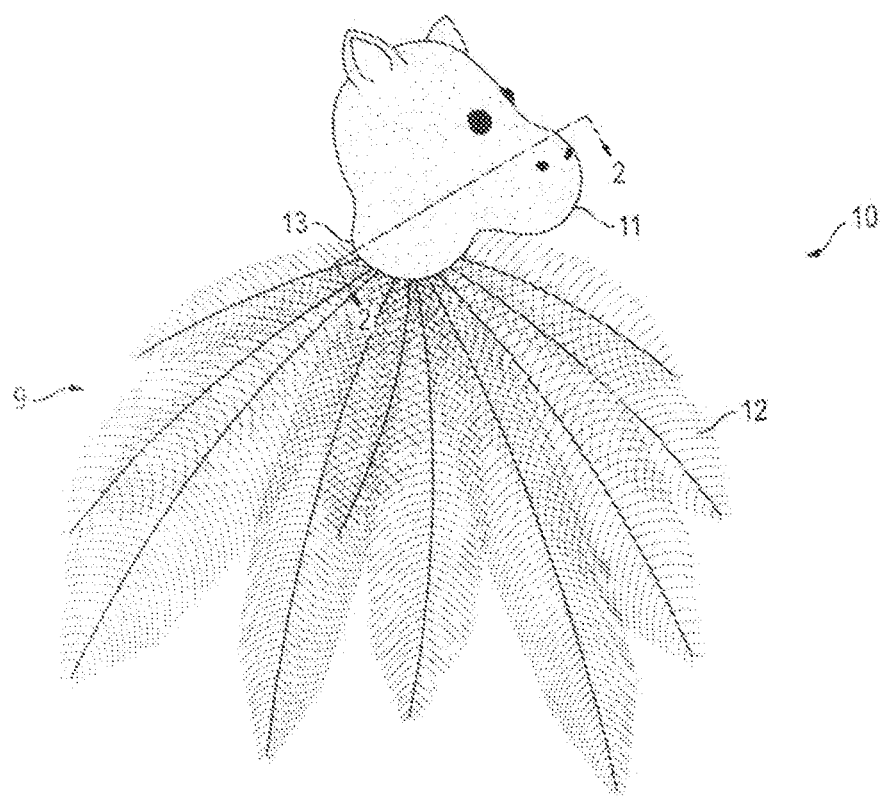
FIG. 1 is a perspective view of the pet toy of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As illustrated in FIG. 1, pet toy 10 comprises head region 11 and a tail 9 in the form of a plurality of feathers 12 each of which are affixed to head region 11 at end 13. Generally speaking, pet toy 10 connotes a shuttlecock which is also called a bird or birdie being a high-drag projectile used in the sport of badminton. Shuttlecocks have tails of an open conical shape formed by overlapping feathers which are usually embedded in a rounded cork base.

Figure 2:
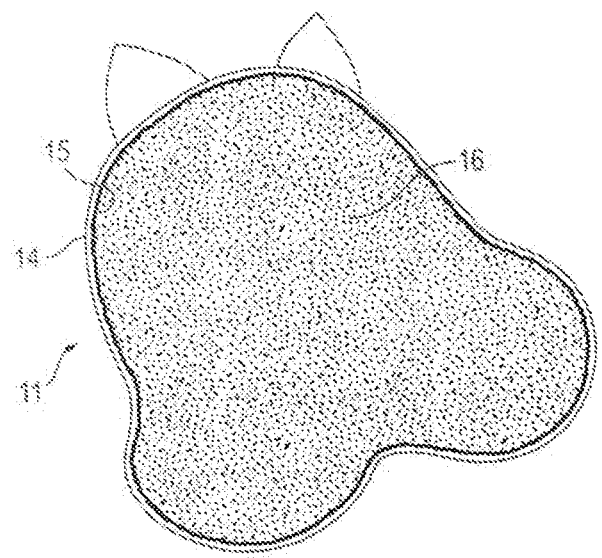
FIG. 2 is a cross-sectional view taken along line 2-2 of FIG. 1.

As noted in reference to FIG. 2, head region 11 is generally configured of a synthetic material backing 15 to which faux fur 14 is affixed. Synthetic material 15 and faux fur 14 define the shape of head region 11 and act as a shell for enclosing a fiber fill and stimulant 16 such as a member selected from the group consisting of catnip, silver vine and mixtures thereof. The head region, as shown, can be the in the shape of an animal head or can be any other arbitrary shape which a pet owner might find appealing to his or her pet.

In use, a pet owner would toss pet toy 10 in the vicinity of his or her pet cat either by throwing pet toy 10 by hand or by using a racket as is done in striking a shuttlecock. Due to the uneven length of feathers 12, the toy will tend to move in an erratic fashion which has been found to stimulate a cat's hunt and pray instincts. As the cat lunges for the toy, it will be influenced by the effects of catnip and/or silver vine resulting in additional stimulation. The synergistic combination of the erratically moving feathered tail 9 together with the hallucinogenic effects of those materials contained within head region 11 result in a stimulating toy that can be used to engage one's pet cat for extended periods of time.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A method of attracting a pet cat, said method comprising tossing or launching a shuttlecock-shaped pet toy, said shuttlecock-shaped pet toy comprising a head region and a single tail emanating therefrom, said head region comprising a synthetic material backing to which faux fur is affixed defining the shape of said head region for enclosing a fill material and stimulant, said stimulant comprising a member selected from the group consisting of catnip, silver vine and mixtures thereof, said tail comprising a plurality of feathers, each of said feathers being affixed to said head region and which fan out there from, at least some of said plurality of feathers being of unequal length causing said pet toy to float and move in an irregular manner upon tossing or launching said pet toy, launching or tossing said shuttlecock-shaped pet toy in the vicinity of a pet cat for attracting the pet cat to the shuttlecock-shaped pet toy and encouraging the pet's interaction there with.

2. The method of claim 1 wherein said pet toy is tossed by throwing said pet toy into the air in the vicinity of a pet cat.

3. The method of claim 1 wherein said pet toy is launched by striking said pet toy with a racket in the vicinity of a pet cat.

4. A shuttlecock-shaped pet toy comprising a head region and a single tail emanating therefrom, said head region comprising a synthetic material backing to which faux fur is affixed defining the shape of said head region for enclosing a fill material and stimulant, said stimulant comprising a member selected from the group consisting of catnip, silver vine and mixtures thereof, said tail comprising a plurality of feathers, each of said feathers being affixed to said head region and which fan out there from, at least some of said plurality of feathers being of unequal length causing said pet toy to float and move in an irregular manner upon tossing or launching said pet toy.

* * * * *